(12) United States Patent
Fleck

(10) Patent No.: US 8,807,130 B2
(45) Date of Patent: Aug. 19, 2014

(54) APPARATUS FOR GENERATING PROCESS HEAT FOR A PACKAGING ARRANGEMENT

(75) Inventor: Norbert Fleck, Palling (DE)

(73) Assignee: Krones AG, Neutraubling (DE)

( * ) Notice: Subject to any disclaimer, the term of this patent is extended or adjusted under 35 U.S.C. 154(b) by 1162 days.

(21) Appl. No.: 12/516,580

(22) PCT Filed: Dec. 5, 2007

(86) PCT No.: PCT/EP2007/010567
§ 371 (c)(1),
(2), (4) Date: Dec. 28, 2009

(87) PCT Pub. No.: WO2008/068008
PCT Pub. Date: Jun. 12, 2008

(65) Prior Publication Data
US 2010/0126498 A1     May 27, 2010

(30) Foreign Application Priority Data
Dec. 7, 2006   (DE) .......................... 10 2006 058 025

(51) Int. Cl.
| F24J 2/34 | (2006.01) |
| F28D 20/00 | (2006.01) |
| F24J 2/42 | (2006.01) |
| F28D 21/00 | (2006.01) |
| C09K 5/06 | (2006.01) |
| C09K 5/10 | (2006.01) |
| F28D 20/02 | (2006.01) |
| B65B 53/02 | (2006.01) |
| F24J 2/05 | (2006.01) |

(52) U.S. Cl.
CPC ............... *F28D 21/00* (2013.01); *Y02E 60/142* (2013.01); *F28D 20/0056* (2013.01); *F24J 2/42* (2013.01); *B65B 53/02* (2013.01); *F24J 2/055* (2013.01); *Y02E 60/145* (2013.01); *Y02E 10/40* (2013.01); *C09K 5/063* (2013.01); *C09K 5/10* (2013.01); *F28D 20/021* (2013.01)
USPC ........... 126/618; 126/617; 126/619; 126/620; 53/440; 53/442; 53/557

(58) Field of Classification Search
USPC ............ 126/617, 618, 619, 620; 53/440, 442, 53/557
See application file for complete search history.

(56) References Cited

U.S. PATENT DOCUMENTS

| 2,933,885 A | | 4/1960 | Vago |
| 4,124,061 A | | 11/1978 | Mitchell et al. |
| 4,204,379 A | * | 5/1980 | Mugnai et al. ................ 53/512 |
| 4,237,676 A | * | 12/1980 | Buckingham et al. .......... 53/398 |
| 4,269,263 A | * | 5/1981 | Yukimachi et al. ........... 165/240 |

(Continued)

FOREIGN PATENT DOCUMENTS

| DE | 2748635 | 5/1978 |
| DE | 3516609 | 12/1985 |

(Continued)

*Primary Examiner* — Jorge Pereiro
(74) *Attorney, Agent, or Firm* — Marshall, Gerstein & Borun LLP

(57) ABSTRACT

An apparatus intended for generating process heat for a packaging arrangement and can be operated using an energy source which can only be regulated to a limited extent, if at all. For this purpose, the apparatus contains a heat-transfer medium and a heat accumulator.

13 Claims, 1 Drawing Sheet

(56) References Cited

U.S. PATENT DOCUMENTS

| | | | |
|---|---|---|---|
| 4,286,141 A * | 8/1981 | MacCracken | 392/346 |
| 4,309,986 A | 1/1982 | Eastman et al. | |
| 4,424,805 A * | 1/1984 | Neary | 126/714 |
| 4,446,041 A * | 5/1984 | Neary | 252/70 |
| 4,449,515 A * | 5/1984 | Nilsson, Sr. | 126/618 |
| 4,458,669 A * | 7/1984 | Lee | 126/618 |
| 4,464,908 A * | 8/1984 | Landerman et al. | 62/235.1 |
| 4,508,101 A * | 4/1985 | Carter et al. | 126/618 |
| 4,545,207 A * | 10/1985 | Neary | 60/645 |
| 4,807,696 A | 2/1989 | Colvin et al. | |
| 4,911,232 A * | 3/1990 | Colvin et al. | 165/104.17 |
| 6,783,612 B2 * | 8/2004 | Benedetti | 148/654 |
| 6,895,145 B2 * | 5/2005 | Ho | 385/35 |
| 7,558,452 B2 * | 7/2009 | Ho | 385/35 |
| 7,614,397 B1 * | 11/2009 | Munson, Jr. | 126/617 |
| 7,767,903 B2 * | 8/2010 | Marshall | 136/243 |
| 2003/0026536 A1 * | 2/2003 | Ho | 385/33 |
| 2005/0109387 A1 * | 5/2005 | Marshall | 136/253 |
| 2006/0016448 A1 * | 1/2006 | Ho | 126/698 |
| 2009/0071627 A1 * | 3/2009 | Seidel | 165/104.19 |

FOREIGN PATENT DOCUMENTS

| | | |
|---|---|---|
| DE | 3543943 | 7/1986 |
| DE | 3834519 | 4/1990 |
| EP | 0678452 | 10/1995 |
| EP | 1288129 | 3/2003 |
| EP | 1705242 | 9/2006 |
| GB | 1585748 | 3/1981 |
| JP | 54052851 | 4/1979 |
| JP | 56137097 | 10/1981 |
| JP | 62196597 | 8/1987 |
| JP | 2002327962 | 11/2002 |
| RU | 2068641 C1 * | 11/1996 |
| WO | WO 8203681 A * | 10/1982 |

* cited by examiner

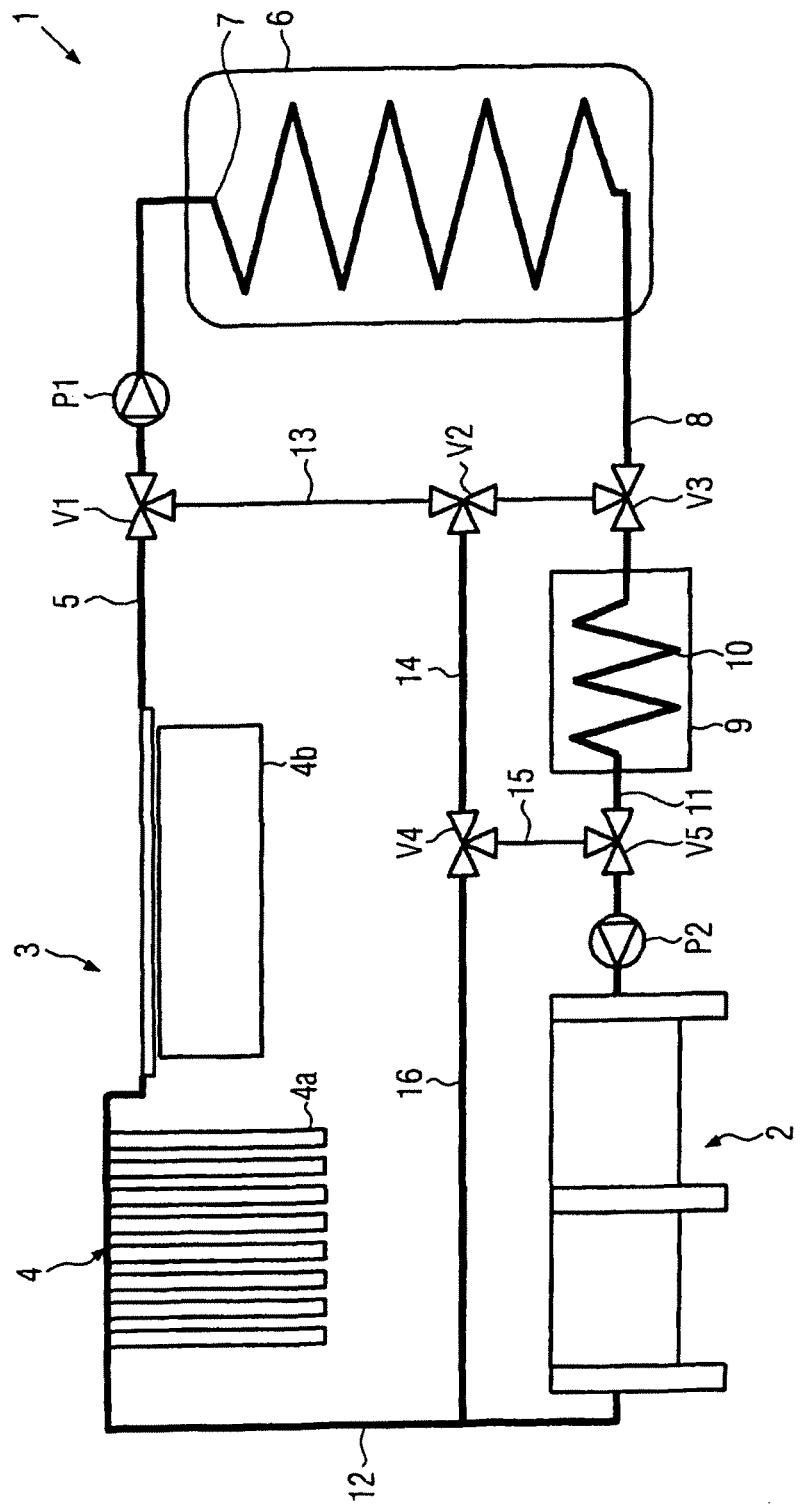

APPARATUS FOR GENERATING PROCESS HEAT FOR A PACKAGING ARRANGEMENT

The present application claims the benefit of priority of International Patent Application No. PCT/EP2007/010567, filed Dec. 5, 2007 which application claims priority of German Patent Application No. 10 2006 058 025.7, filed Dec. 7, 2006. The entire text of the priority application is incorporated herein by reference in its entirety.

FIELD OF THE DISCLOSURE

The disclosure relates to an apparatus for generating process heat for a packaging device.

BACKGROUND

Costs of energy for the operation of plants are a cost factor not to be underestimated, which can, moreover, not be calculated in the long run if fossil fuels are used. Therefore, efforts have already been made in the most different fields to obtain the necessary energy from other alternative sources, such as from a solar system or a combustion plant for renewable resources. However, so far these energy sources were only used for heating fluids, especially water. It is described, for example, in EP 1 705 242 to use solar collectors for covering at least a part of the thermal energy consumption of a brewery plant, specifically for mashing, lautering and/or wort-cooking, but also for cleaning the plant or for operating a sorptive refrigerating plant. The plant is operated with water as heat transfer medium, which simultaneously serves as process water and is stored in a hot-water heat accumulator. However, this plant allows flow temperatures of a maximum of 180° C.

Packaging devices, especially in the form of the known shrinking devices, were so far mainly heated electrically or sporadically also with natural gas. Examples for packaging devices in the form of shrinking devices are disclosed, for example, in DE 35 16 609, DE 35 43 943, EP 1 288 129 or EP 678452. However, packaging systems require a far higher temperature, for example, for heating the air in shrinking devices, as compared to the heating of process water or heating purposes, and they require a more intensive temperature control, which was previously considered non-practicable if energy sources were used that are not or only to a limited extent controllable, which is the case if heat is generated in solar systems or combustion plants.

SUMMARY OF THE DISCLOSURE

Therefore, the disclosure is based on the object to extend the field of application of alternatively generated energy.

According to the disclosure it was found that alternative energies, such as solar energy or combustion energy from renewable resources or the like are, in fact, suited for the generation of process heat for a packaging device.

A particularly preferred field of application for the apparatus according to the disclosure is the generation of the heat for a shrink station.

The field of application is increased by the use of a high-temperature heat accumulator.

In order to reach the necessary high temperatures, and in order to make sure that the provided flow temperatures can be kept substantially constant, it is preferred to use a phase-change material which may be selectively chosen in accordance with the temperature to be provided.

In order to provide higher temperatures it is preferred to employ a metal, with bismuth being particularly suited for shrink stations. It is also possible to use salts, the melting point of which is in the appropriate temperature range, e.g. crystalline sodium hydroxide.

In order to provide higher temperatures it is preferred to use a heat transfer medium which differs from the process medium. Preferably, the heat transfer medium is a heat transfer oil. Alternatively, also pressurized water may be considered.

Preferably, a solar system serves as energy source, which comprises commercial solar collectors. In order to reach higher temperatures particularly a parabolic collector is suited, which can reach the necessary temperatures, but may also be replaced, for example, by evacuated tube collectors or, for a two-stage operation, may be connected downstream of an evacuated tube collector. Collectors comprising heliostat mirrors likewise permit a high temperature level.

For bridging periods when there is no or little insolation the energy source can, moreover, comprise a combustion unit specifically for renewable resources, which may also be used as a single energy source, however, and is then preferably coupled to the above-described hot-temperature heat accumulator.

BRIEF DESCRIPTION OF THE DRAWINGS

The disclosure shall be described by means of the single FIG. 1 below, which shows a schematic representation of an apparatus for generating process heat.

DETAILED DESCRIPTION OF THE PREFERRED EMBODIMENT

In the embodiment shown, the apparatus 1 is adopted to generate process heat for a packaging device 2, specifically a shrink station. The shrink station 2 is designed as a hot-air tunnel furnace (so-called shrink tunnel), through which non-illustrated objects, e.g. bottles, cans, cartons, loaded pallets or the like move continuously, which are to be welded into a plastic shrink film individually or in groups or are to be provided with shrink labels. Any prior system may be used as shrink station. Preferably, the shrink station is operated with air nozzles, through which the heated air is blown against the shrink film. However, the disclosure can also be used in other packaging devices—working continuously or discontinuously—in which heat is required for a packaging process.

The heat necessary for the packaging is supplied by an energy source 3, which provides its energy in a non-controllable manner or controllable only to a limited extent (not fast). In the embodiment shown, the energy source 3 comprises a solar system 4 which is equipped with conventional types of solar collectors. In the embodiment shown, the solar system 4 is operated on a two-stage basis, that is, it comprises at least one flat-plate or (preferably) evacuated tube collector 4a which can be, for example, a part of a heater or a service water heater already provided or installed together with the apparatus 1. However, the solar system 4 further comprises a collector 4b, which is capable of supplying a higher temperature than the collectors 4a. Preferably, the collector 4b is a parabolic trough collector. The solar system 4 serves the direct or indirect heating of a heat transfer medium (depending on the type of the collector), especially of a high-temperature-resistant heat transfer oil or pressurized water. The heat transfer medium flows from the solar system through a duct 5, preferably via a pump P1, into a high-temperature heat accumulator 7. As, according to experience, only a part of the rated capacity is required on the daily average, the heat accumulator 7 should store the generated excess heat for a later retrieval. The high-temperature heat accumulator 7 should be capable of supplying a temperature of more than 185° C., preferably more than 200° C., approximately 300° C., and specifically preferably in the range of 250 to 350° C., that is, of supplying a flow temperature sufficient to operate the packaging device employed, e.g. the shrink station 2. In order to operate the shrink station 2 by means of air nozzles, the flow temperature has to be adapted to the conditions of the apparatus 1 in such a way that the temperature of the air exiting the air nozzles is between 180 and 250° C., wherein the packaging film and/or the shrink label is brought to a shrink and softening temperature between 80 and 100° C. within a time window of 9 to 12 seconds, so that the shrink film wraps tightly around the objects to be packed and possibly present overlapping regions of the film are welded together.

The heat accumulator 7 can, for example, be a thermally insulated solid body, e.g. one or more massive blocks of gray cast iron. Preferably, the heat accumulator 7 includes a phase-change material, however, the solidification and melting energy of which are utilized. The phase-change material may be chosen in such a way that higher temperatures can be stored as well and, when retrieving the stored temperature, the energy remains approximately constant until the phase-change process is concluded. Thus, by using a phase-change material in the heat accumulator 7, it is possible to provide a relatively high temperature and release it constantly over a longer period. Phase-change materials are known in the most various forms and temperature ranges. For the inventive apparatus 1 for providing shrink heat particularly metals having a low or mean melting point are used. Suited storage media are, for example, lead (327° C. at 23 J/g), cadmium (321° C. at 56 J/g), bismuth (271° C. at 52.2 J/g), tin (232° C. at 59.6 J/g), zinc (420° C. at 111 J/g) and alloys from these metals. Particularly preferred with respect to the temperature range is bismuth.

The heat accumulator 7 is melted by the heat transfer medium, i.e. the heat transfer oil guided from the duct 5 in a coil 6 through the heat accumulator 7, and releases its energy absorbed during the melting again during the solidification. As the heat transfer medium is not in direct contact with the phase-change material, i.e. as the system is accordingly closed, also toxic phase materials may, on principle, be used.

The heat transfer medium exits the heat accumulator 7 through a duct 8. For poor weather periods and the production start before sunrise the energy source 3 is, moreover, provided with a conventional additional heating. Suited as a conventional additional heating is, for example, a combustion unit 9 including a boiler, which can be readily operated also with alternative fuels (e.g. biomass, process wastes etc.). The duct 8 from the heat exchanger 7 enters into the boiler of the combustion unit 9, with the heat transfer medium (oil) being heated in a duct coil 10 by the heat transfer medium provided in the boiler, usually water. The heat transfer medium (oil) exits the combustion unit 9 through a duct 11 in which, again, a pump P2 may be provided, and then enters the packaging device 2 so as to provide therein the heat required for the packaging, that is, for example, to heat the air used for the shrinking.

Downstream of the packaging device 2 the heat transfer medium is conducted through a duct 12 in the cycle, back to the solar system 4, where it is heated again.

To allow an operation process of the apparatus 1 according to the disclosure that is as flexible as possible, a plurality of bypass or sub-cycles are provided. Thus, for example, by bypassing the heat accumulator 7, duct 5 is connected to duct 8 by a duct 13, which is integrated in duct 5 by a valve V1, is guided via valve V2 and extends into duct 8 by a valve V3. The combustion unit 9 is bypassed by a duct 14, which is connected via valve V2 to duct 13 and via valve V3 to duct 8, and by another valve V4 to a duct 15 and via the duct 15 via another valve V5 to duct 10 upstream of the pump P2.

In order to ensure an operation also without the solar system 4, duct 12 is connected to the combustion unit 9 via a duct 16, ducts 14 and 13 and valve V3 in a cycle, by bypassing the solar system 4.

The embodiment as described allows the operation of the apparatus 1 in the most various operating states, whereby the follow paths can be connected:

1. operation without solar collectors:
energy supply by means of boiler
path 1 ("heating ON"):
additional heating 9→V5→P2→shrink station 2→V4→V2→V3→additional heating 9
path 2 ("heating OFF"): excess heat into heat accumulator 7
additional heating 9→V5→V4→V2→V1→P1→heat accumulator 7→V3→additional heating 9

2. solar operation with additional heating:
energy supply by means of additional heating and solar collectors
path 1 ("heating ON"):
solar system 3→V1→V2→V3→additional heating 9→V5→P2→shrink tunnel 2→solar system 3
path 2 ("heating OFF"): heat accumulator 7 is charged.
solar system 3→V1→P1→heat accumulator 7→V3→additional heating 9→V5→V4→solar system 3

3. solar operation without additional heating:
energy supply by means of solar collectors
path 1a ("heating ON"): (heat accumulator is cold)
solar system 3→V1→V2→V4→V5→P2→shrink station→solar system 3
path 1b ("heating ON"): heat accumulator is preheated for temperature stabilization
solar system 3→V1→P1→heat accumulator 7→V3→V2→V4→V5→P2→solar system 3→shrink station 3
path 2 ("heating OFF"): heat accumulator is charged
solar system 3→V1→P1→heat accumulator 7→V3→V2→V4→solar system 3

4. heat accumulator operation:
energy supply by means of heat accumulator (and additional heating)
path 1 ("heating ON"):
heat accumulator 7→V3→additional heating 9→V5→P2→shrink station 7→V4→V2→V1→P1→heat accumulator 7
path 2 ("heating OFF"):
heat accumulator 7→V3→additional heating 9→V5→V4→V2→V1→P1→heat accumulator 7

Specifically if a high-temperature heat accumulator 7 of the type described is used, also a combustion unit comprising a boiler 9, without a solar system, may be used for generating process heat for any purposes of use where a high temperature is necessary. In climatically preferred regions, however, merely a solar system may be provided. In this case, too, due to the use of the high-temperature heat accumulator, the purpose of use is not limited to packaging devices.

The invention claimed is:

1. Apparatus for generating process heat for a packaging device comprising a shrink station, wherein the apparatus comprises an energy source comprising a solar system, a heat transfer medium, and a heat accumulator, wherein the packaging device, the energy source, and the heat accumulator are connected such that heat can be transferred from the energy source to the heat accumulator and from the heat accumulator to the packaging device by the heat transfer medium.

2. Apparatus according to claim 1, wherein the heat accumulator is a high-temperature heat accumulator.

3. Apparatus according to claim 2, wherein the high-temperature heat accumulator comprises a phase-change material.

4. Apparatus according to claim 3, wherein the heat accumulator comprises a metal.

5. Apparatus according to claim 4, wherein the metal is bismuth.

6. Apparatus according to claim 2, wherein the high-temperature heat accumulator provides a temperature of at least 185° C.

7. Apparatus according to claim 6, wherein the temperature is in the range between approximately 250° C. and 350° C.

8. Apparatus according to claim 1, wherein the heat transfer medium is one of a heat transfer oil or pressurized water.

9. Apparatus according to claim 1, wherein the solar system comprises an evacuated tube collector.

10. Apparatus according to claim 1, wherein the solar system comprises a parabolic collector.

11. Apparatus according to claim 1, wherein the solar system comprises two stages.

12. Apparatus according to claim 1, further comprising a combustion unit.

13. Apparatus according to claim 12, wherein the combustion unit is for renewable resources.

* * * * *